United States Patent [19]

Hoff

[11] Patent Number: 4,758,357
[45] Date of Patent: Jul. 19, 1988

[54] DISPERSIBLE HYDROPHILIC POLYMER COMPOSITIONS FOR USE IN VISCOSIFYING HEAVY BRINES

[75] Inventor: Michael H. Hoff, Houston, Tex.

[73] Assignee: NL Industries, Inc., New York, N.Y.

[21] Appl. No.: 918,838

[22] Filed: Oct. 14, 1986

[51] Int. Cl.$^4$ .......................... C09K 7/02; E21B 43/00
[52] U.S. Cl. .............. 252/8.551; 252/8.514; 252/363.5
[58] Field of Search .......... 252/8.51, 8.514, 8.551, 252/363.5; 536/87

[56] References Cited

U.S. PATENT DOCUMENTS

| | | | |
|---|---|---|---|
| 4,330,414 | 5/1982 | Hoover | 252/8.51 |
| 4,392,964 | 7/1983 | House et al. | 252/8.551 X |
| 4,435,564 | 3/1984 | House | 536/87 |
| 4,459,214 | 7/1984 | House et al. | 252/8.551 X |
| 4,514,310 | 4/1985 | Heilweil | 252/8.551 |

FOREIGN PATENT DOCUMENTS 2000799 1/1979 United Kingdom .

OTHER PUBLICATIONS

The Condensed Chemical Dictionary, Sixth Edition, 1966, Reinhold Pub. Corp., New York, p. 961.

Primary Examiner—Herbert B. Guynn
Attorney, Agent, or Firm—Browning, Bushman, Zamecki & Anderson

[57] ABSTRACT

A thickening composition for use in viscosifying aqueous mediums, particularly heavy brines, comprising hydroxyethyl cellulose, 2-pyrrolidone and a mono alkyl ether of ethylene glycol which is water soluble and exerts no appreciable swelling effect on the hydroxyethyl cellulose, the weight ratio of hydroxyethyl cellulose to 2-pyrrolidone being less than about 2.6:1.

12 Claims, No Drawings

DISPERSIBLE HYDROPHILIC POLYMER COMPOSITIONS FOR USE IN VISCOSIFYING HEAVY BRINES

BACKGROUND OF THE INVENTION

1. Field of the Invention

The present invention relates to compositions for use as thickening or viscosifying agents in aqueous systems and, more particularly, the aqueous well servicing fluid prepared therefrom.

2. Description of the Background

It is known from U.S. Pat. Nos. 4,330,414 and 4,435,564 that compositions containing HEC can be used to thicken aqueous substances such as heavy brines commonly employed as well servicing fluids, if the HEC is formulated in certain ways. Thus, for example, in U.S. Pat. No. 4,330,414, it is taught that a mixture of HEC, a solvating agent, which is an agent that pre-hydrates the HEC, and a diluent which is a non-solvating agent for the HEC will effectively viscosify heavy brines, i.e. brines having a density greater than about 11.7 pounds per gallon (ppg) and more generally from about 12.0 ppg to about 19.2 ppg. U.S. Pat. No. 4,435,564 teaches that a composition containing HEC, certain amino compounds and an organic liquid which does not pre-hydrate the HEC is useful in viscosifying heavy brines at ambient temperatures.

SUMMARY OF THE INVENTION

It is therefore an object of the present invention to provide an improved composition for thickening aqueous mediums, especially heavy brines having a density greater than about 11.7 ppg.

A further object of the present invention is to provide an improved, aqueous well servicing fluid.

The above and other objects of the present invention will become apparent from the description given herein and the appended claims.

In accordance with the present invention, there is provided, in one embodiment of the invention, a thickening composition for use in viscosifying aqueous mediums comprising HEC, 2-pyrrolidone and a mono alkyl ether of ethylene glycol which is water soluble and does not appreciably swell the HEC, the weight ratio of the HEC to the 2-pyrrolidone being less than about 2.5:1.

In another embodiment of the present invention, there is provided a well servicing fluid comprising an aqueous medium such as a brine and the thickening composition described above.

DESCRIPTION OF THE PREFERRED EMBODIMENT

The thickening compositions of the present invention utilize, as a hydrophilic polymer, HEC as the primary component to provide the viscosifying effect. HEC polymers are solid, particulate materials which are water soluble or water dispersible and which upon solution or dispersion in an aqueous medium increase the viscosity of the medium. HEC polymers are generally high yield, water soluble, non-ionic materials produced by treating cellulose with sodium hydroxide followed by reaction with ethylene oxide. Each anhydroglucose unit in the cellulose molecule has three reactive hydroxy groups. The average number of moles of the ethylene oxide that becomes attached to each anhydroglucose unit in cellulose is called moles of substituent combined. In general, the greater the degree of substitution, the greater the water solubility. In general, it is preferable to use HEC polymers having as high a mole substitution level as possible.

In addition to HEC, the compositions of the present invention also contain 2-pyrrolidone and a mono alkyl ether of ethylene glycol. The mono alkyl ethers of ethylene glycol useful in the compositions of the present invention are those ethers which are water soluble or water miscible and exert no appreciable swelling effect on the HEC. For purposes of determining if a given ether is suitable for use in the compositions of the present invention, the following test can be used: two parts by weight of the liquid ether is mixed with one part by weight of the HEC in a sealable container, and the mixture allowed to remain in a quiescent state in the sealed container for a period of about one week. If the ether being tested has no appreciable swelling effect on the HEC, there will be free, liquid ether in the container after the one week period. Non-limiting examples of suitable ethers within the scope of the present invention include ethylene glycol monobutyl ether (2-butoxyethanol), ethylene glycol isobutyl ether (2-(2-butoxyethoxy)-ethanol), etc. Ethers such as ethylene glycol monohexyl ether are unsuitable for use since they are insoluble in water.

In the compositions of the present invention, the HEC will generally be present in a weight ratio of HEC polymer to 2-pyrrolidone of less than about 2.6:1, preferably in the range from about 2.6:1 to about 1:2. Desirable compositions, which are pourable liquids, and which will effectively viscosify aqueous mediums can be produced from compositions containing from about 10 to about 25% by weight HEC polymer, from about 10 to about 60% by weight 2-pyrrolidone and from about 10 to about 60% by weight of the mono alkyl ether of ethylene glycol.

A feature of the compositions of the present invention is that there is no necessity, as apparently taught in U.S. Pat. Nos. 4,330,414 and 4,435,564, to utilize organophilic clay-like materials to formulate certain well servicing fluids. Such clay containing materials are undesirable in clear well servicing fluids used for workover and completion operations. Also, since the thickening compositions of the present invention are essentially non-aqueous, problems associated with rusting of containers used to transport and store the thickening agents are eliminated.

While the thickening compositions of the present invention are useful as viscosifiers or suspending agents in numerous systems which require viscosity enhancement, they find particular utility in the preparation of well servicing fluids and, more particularly, well servicing fluids made from aqueous mediums containing soluble salts such as, for example, a soluble salt of an alkali metal, an alkaline earth metal, a Group IB metal, a Group IIB metal, as well as water soluble salts of ammonia and other cations. The thickener compositions are particularly useful in the preparation of thickened heavy brines, i.e. aqueous solutions of soluble salts of multivalent cations, e.g. Zn and Ca.

The most preferred thickened heavy brines, particularly those used for well servicing fluids, i.e. completion and workover fluids, are made from brines having a density greater than about 11.7 ppg, particularly from about 12 to about 19.2 ppg. Especially preferred heavy brines comprise water solutions of salts selected from the group consisting of calcium chloride, calcium bromide, zinc chloride, zinc bromide, and mixtures thereof. Generally, in formulating well servicing fluids using heavy brines, the thickening composition will be present in an amount of from about 0.5 to about 3 ppg, calculated as active HEC.

To more fully illustrate the present invention, the following non-limiting examples are presented. In the following examples, the HEC polymer employed, unless otherwise indicated, was an HEC marketed by Hercules under the tradename NATRASOL 250 HHR.

EXAMPLE 1

Thickening compositions were prepared by admixing together 2-pyrrolidone and 2-butoxyethanol followed by the addition of HEC with stirring for approximately five minutes. The thickening composition thus prepared contained 38% by weight 2-pyrrolidone, 42% by weight 2-butoxyethanol and 20% by weight HEC. The product was found to be pourable, fast yielding and possessed excellent suspension characteristics, there being no liquid/solid separation.

The rheological properties of the thickening composition prepared above were evaluated at a concentration of 1.5 pounds per barrel, active HEC in various brines. The data are shown in the table below.

TABLE

| Test Brine | AV[1] For Stir Time, Min | | | | AV After Not Roll 16 hr 150° | % of max yield[2] |
|---|---|---|---|---|---|---|
| | 0 | 20 | 40 | 60 | | |
| 9.7 lb/gal KCl | 1.5 | 20.5 | 21.5 | 22 | 21.5 | 102 |
| 10.0 lb/gal NaCl | 2.5 | 26.5 | 31 | 32 | 33 | 97 |
| 11.3 lb/gal KBr | 1.5 | 24 | 25 | 25 | 25.5 | 98 |
| 12.4 lb/gal NaBr | 2.5 | 32.5 | 34 | 34.5 | 42.5 | 81 |
| 11.6 lb/gal CaCl$_2$ | 8.5 | 61.5 | 70.5 | 72.5 | 78.5 | 92 |
| 14.2 lb/gal CaBr$_2$ | 7 | 59 | 66 | 69 | 74.5 | 92 |
| 15.0 lb/gal CaBr$_2$ | 12 | 62.5 | 83.5 | 89 | 98 | 91 |
| 16.0 lb/gal Ca/ZnBr$_2$ | 9 | 27 | 36.5 | 43 | 87.5 | 49 |
| 19.2 lb/gal Ca/ZnBr$_2$[3] | 31 | 89 | 132 | 164 | 221 | 74 |

[1]All samples stirred 60 min. using Fann 35A rheometer at 600 RPM, 75° F.
[2]% maximum yield: (AV after 1 hr. at 600 RPM/AV after hot roll) × 100
[3]Data for 19.2 lb/gal Ca/ZnBr$_2$ system based on 300 RPM dial readings The percent of maximum yield is an indication of the ease with which the brine can be viscosified without shearing or heat. As can be seen, even in very heavy brines, the compositions of the present invention provide excellent viscosification without the necessity for shearing or elevated temperatures.

EXAMPLE 2

A thickening composition containing 30% by weight 2-pyrrolidone, 50% by weight 2-butoxyethanol, and 20% HEC was prepared. The formulation exhibited rheological properties similar to the thickening composition prepared as per Example 1. Pour characteristics of the thickening composition were found to be slightly better than the thickening composition produced by the procedure of Example 1.

EXAMPLE 3

To assess the effect of long term storage on the thickening composition of the present invention, an accelerated aging study was conducted. Two thickening compositions prepared in accordance with the procedure of Example 1 were crimp sealed in five gallon, unlined, mild steel pails placed in a 120° F. steam bath heated hot house for three months. After three months aging, the steel pails were in excellent condition, no rusting or deterioration being observed. Although the thickening compositions were found to be marginally pourable, the rheological characteristics of the thickening composition were unaffected.

EXAMPLE 4

The procedure of Example 1 was followed with the exception that 2-(2-butoxyethoxy)-ethanol was substituted for 2-butoxyethanol. Although acceptable, the rheological property of the thickening composition containing the 2-isobutoxyethanol were not as good as those obtained with the thickening composition of Example 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which some within the meaning and range of equivalence of the claims are therefore intended to be embraced therein.

What is claimed is:

1. A composition for use in viscosifying aqueous mediums comprising hydroxyethyl cellulose, 2-pyrrolidone and a mono alkyl ether of ethylene glycol which is water soluble and which has no appreciable swelling effect on the hydroxyethyl cellulose, the weight ratio of hydroxyethyl cellulose to 2-pyrrolidone being less than about 2.6:1, said 2-pyrrolidone being present in an amount of from about 10 to about 60% by weight and said ether is present in an amount of from about 10 to about 60% by weight.

2. The composition of claim 1 wherein the weight ratio of said hydroxyethyl cellulose to said 2-pyrrolidone is from about 2.6:1 to about 1:2.

3. The composition of claim 1 wherein said hydroxyethyl cellulose is present in an amount of from about 10 to about 25% by weight.

4. The composition of claim 1 wherein said mono alkyl ether comprises 2-butoxyethanol.

5. A well servicing fluid comprising:
an aqueous medium; and
a viscosifying composition comprising hydroxyethyl cellulose, 2-pyrrolidone and a mono alkyl ether of ethylene glycol which is water soluble and which has no appreciable swelling effect on the hydroxyethyl cellulose, the weight ratio of hydroxyethyl cellulose to 2-pyrrolidone being less than about 2.6:1, wherein said 2-pyrrolidone is present in an amount of from about 10 to about 60% by weight and said ether is present in an amount of from about 10 to about 60% by weight.

6. The composition of claim 5 wherein said aqueous medium comprises a solution of at least one water soluble salt of a multivalent metal ion.

7. The composition of claim 6 wherein said aqueous medium has a density greater than about 11.7 pounds per gallon.

8. The composition of claim 7 wherein said water soluble salt is selected from the group consisting of calcium chloride, calcium bromide, zinc chloride, zinc bromide and mixtures thereof.

9. The composition of claim 8 wherein the density of said aqueous medium is from about 12.0 pounds per gallon to about 19.2 pounds per gallon.

10. The composition of claim 5 wherein the weight ratio of said hydroxyethyl cellulose to said 2-pyrrolidone is from about 2.6:1 to about 1:2.

11. The composition of claim 5 wherein said hydroxyethyl cellulose is present in an amount of from about 10 to about 25% by weight.

12. The composition of claim 5 wherein said mono alkyl ether comprises 2-butoxyethanol.

* * * * *